United States Patent
Oya et al.

(10) Patent No.: US 12,503,153 B2
(45) Date of Patent: Dec. 23, 2025

(54) STEERING CONTROL DEVICE AND STEERING CONTROL METHOD

(71) Applicant: JTEKT CORPORATION, Kariya (JP)

(72) Inventors: Toshiaki Oya, Sakai (JP); Yoshinobu Shimizu, Sakai (JP)

(73) Assignee: JTEKT CORPORATION, Kariya (JP)

( * ) Notice: Subject to any disclaimer, the term of this patent is extended or adjusted under 35 U.S.C. 154(b) by 68 days.

(21) Appl. No.: 18/719,625

(22) PCT Filed: Jan. 20, 2022

(86) PCT No.: PCT/JP2022/001985
§ 371 (c)(1),
(2) Date: Jun. 13, 2024

(87) PCT Pub. No.: WO2023/139722
PCT Pub. Date: Jul. 27, 2023

(65) Prior Publication Data
US 2025/0058818 A1 Feb. 20, 2025

(51) Int. Cl.
*B62D 5/00* (2006.01)
*B62D 1/12* (2006.01)
*B62D 6/00* (2006.01)

(52) U.S. Cl.
CPC ............ *B62D 5/006* (2013.01); *B62D 1/12* (2013.01); *B62D 6/008* (2013.01)

(58) Field of Classification Search
CPC ........... B62D 5/006; B62D 1/12; B62D 6/008
See application file for complete search history.

(56) References Cited

U.S. PATENT DOCUMENTS

2015/0225014 A1   8/2015   Takeda
2020/0290669 A1   9/2020   Okano et al.
(Continued)

FOREIGN PATENT DOCUMENTS

EP      2 905 207 B1   12/2016
JP     H08-034353 A    2/1996
(Continued)

OTHER PUBLICATIONS

JP 2007090924 A (Machine Translation of the Specification), (Translated by J-PlatPat), (Year: 2007).*
(Continued)

*Primary Examiner* — Jacob M Amick
(74) *Attorney, Agent, or Firm* — Oliff PLC

(57) ABSTRACT

A steering control device is configured to calculate a reaction force command value to reflect a reaction force component calculated based on an operation amount of an operating lever, and generate a control signal based on the reaction force command value. The steering control device is configured to execute a keeping state determination process for determining whether a keeping condition for the operation amount is satisfied, and a calculation mode switching process for switching a calculation mode of the reaction force command value to a keeping state calculation mode when the keeping condition is satisfied. The keeping state calculation mode is configured such that a dead band that is a range in which the reaction force component does not change with respect to the operation amount is larger than a dead band in a normal state calculation mode.

17 Claims, 7 Drawing Sheets

(56) References Cited

U.S. PATENT DOCUMENTS

| | | | |
|---|---|---|---|
| 2020/0298901 A1 | 9/2020 | Anraku et al. | |
| 2020/0307675 A1* | 10/2020 | Yamashita | B60W 40/08 |
| 2020/0307680 A1 | 10/2020 | Kakimoto et al. | |
| 2020/0307681 A1 | 10/2020 | Kakimoto et al. | |
| 2021/0053613 A1 | 2/2021 | Kodera et al. | |
| 2022/0355857 A1* | 11/2022 | Igarashi | B62D 15/021 |
| 2024/0149942 A1* | 5/2024 | Hirata | B62D 6/02 |

FOREIGN PATENT DOCUMENTS

| | | | |
|---|---|---|---|
| JP | 2002-160659 A | | 6/2002 |
| JP | 2002-160660 A | | 6/2002 |
| JP | 2003-081120 A | | 3/2003 |
| JP | 2003-165456 A | | 6/2003 |
| JP | 2003-165460 A | | 6/2003 |
| JP | 2003-175854 A | | 6/2003 |
| JP | 2007090924 A | * | 4/2007 |
| JP | 2016-084003 A | | 5/2016 |
| JP | 2020-152331 A | | 9/2020 |
| JP | 2020-163989 A | | 10/2020 |
| JP | 2020-163990 A | | 10/2020 |
| JP | 2021-030837 A | | 3/2021 |

OTHER PUBLICATIONS

Feb. 5, 2025 extended Search Report issued in European Patent Application No. 22921880.5.

Apr. 12, 2022 International Search Report issued in International Patent Application No. PCT/JP2022/001985.

* cited by examiner

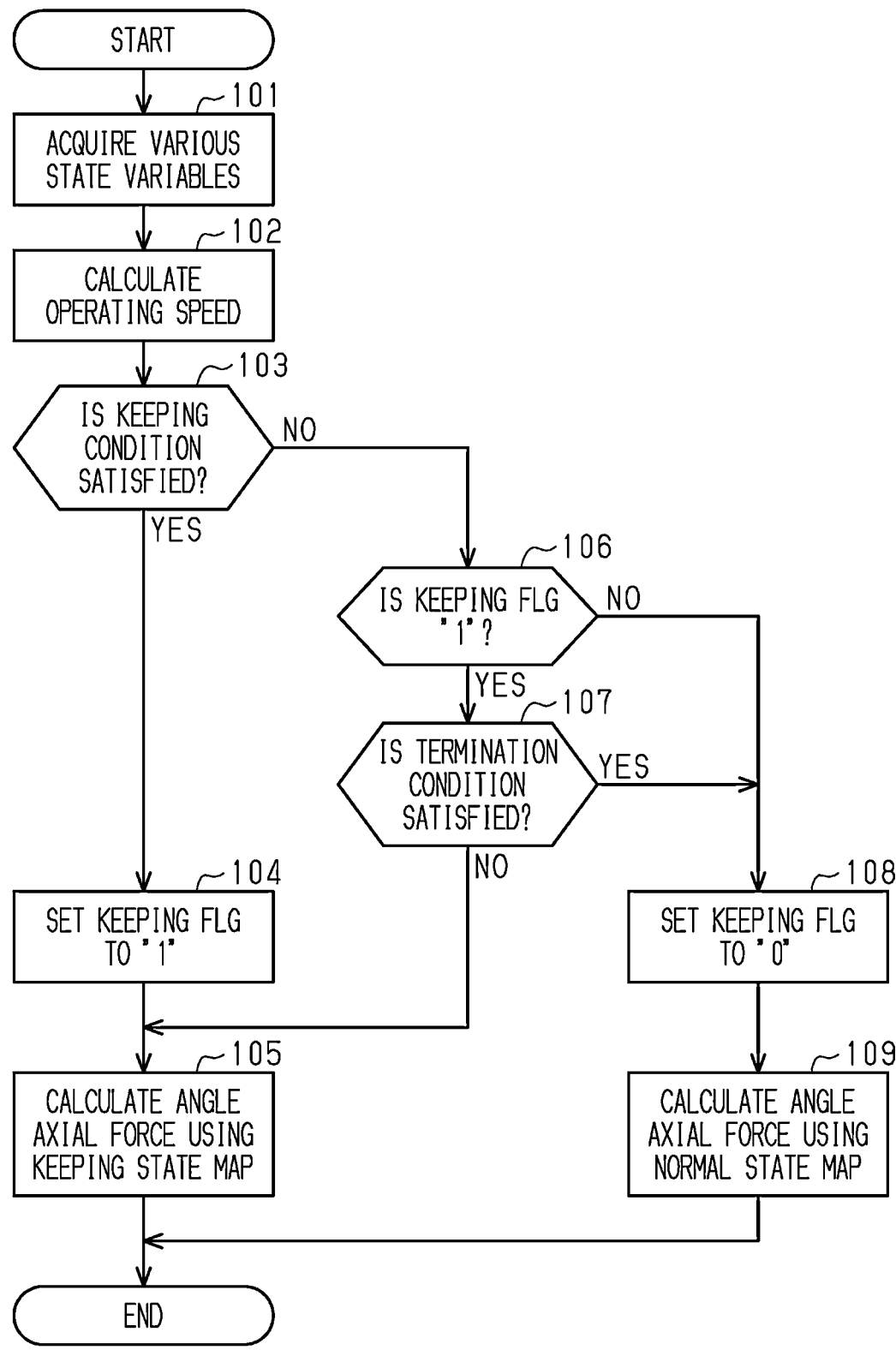

STEERING CONTROL DEVICE AND STEERING CONTROL METHOD

CROSS-REFERENCE TO RELATED APPLICATIONS

This application is national stage application of International Application No. PCT/JP2022/001985, filed on Jan. 20, 2022, which designates the United States, the entire contents of which are incorporated herein by reference.

TECHNICAL FIELD

The present disclosure relates to steering control devices and steering control methods.

BACKGROUND ART

Conventionally, there is a steer-by-wire steering system in which a power transmission path between an operation unit to which a steering wheel is connected and a steering unit that steers steered wheels is separated. For example, as described in Patent Document 1, a steering control device that controls such a steering system changes the angle ratio of the steered angle of the steered wheels to the steering angle of the steering wheel according to the traveling condition of a vehicle.

Patent Document 2 discloses a configuration in which, in addition to or instead of a steering wheel, a joystick is used as an operating member to be operated by a driver. When the joystick is operated in this way, a reaction torque is applied according to the amount of the operation.

RELATED ART DOCUMENTS

Patent Documents

Patent Document 1: Japanese Unexamined Patent Application Publication No. 2021-30837 (JP 2021-30837 A)
Patent Document 2: Japanese Unexamined Patent Application Publication No. H08-34353 (JP H08-34353 A)

SUMMARY OF THE INVENTION

Problem to be Solved by the Invention

When applying the reaction torque according to the amount of joystick operation as described above, the application of the reaction torque according to the amount of joystick operation is kept by, for example, the driver keeping the constant amount of the operation. In this case, the driver is kept in a state in which the reaction torque is applied through the joystick. That is, when keeping the constant amount of joystick operation, the driver needs to continuously apply a force corresponding to the reaction torque to the joystick. This places a burden on the driver.

Means for Solving the Problem

One aspect of the present disclosure provides a steering control device that controls a steering system of a vehicle. The steering system has a structure in which a power transmission path between an operation unit including an operating lever and configured to apply an operation reaction force to the operating lever according to an operation amount of the operating lever and a steering unit configured to steer a steered wheel is separated. The steering control device includes: a reaction force command value calculation unit configured to calculate a reaction force command value that is a command value of the operation reaction force to reflect a reaction force component calculated based on a state variable obtained from the vehicle; and a control signal generation unit configured to generate a control signal for operating the operation unit based on the reaction force command value. The reaction force command value calculation unit includes a keeping state calculation mode and a normal state calculation mode as calculation modes of the reaction force command value. The normal state calculation mode is a mode in which the reaction force command value is calculated in a non-keeping state in which the operation amount is not kept constant. The keeping state calculation mode is a mode in which the reaction force command value is calculated in a keeping state in which the operation amount is kept constant, and is a mode in which the reaction force command value having an absolute value smaller than an absolute value of the reaction force command value calculated in the normal state calculation mode is calculated. The reaction force command value calculation unit is configured to execute: a keeping state determination process for determining whether a keeping condition for detecting the keeping state is satisfied; and a calculation mode switching process for switching the calculation mode of the reaction force command value to the keeping state calculation mode when the keeping condition is satisfied. The keeping state calculation mode is configured such that a dead band that is a range in which the reaction force component does not change with respect to the operation amount is larger than a dead band in the normal state calculation mode.

Another aspect of the present disclosure provides a steering control device that controls a steering system of a vehicle. The steering system has a structure in which a power transmission path between an operation unit including an operating lever and configured to apply an operation reaction force to the operating lever according to an operation amount of the operating lever and a steering unit configured to steer a steered wheel is separated. The steering control device includes: a reaction force command value calculation unit configured to calculate a reaction force command value that is a command value of the operation reaction force to reflect a reaction force component calculated based on a state variable obtained from the vehicle; and a control signal generation unit configured to generate a control signal for operating the operation unit based on the reaction force command value. The reaction force command value calculation unit includes a keeping state calculation mode and a normal state calculation mode as calculation modes of the reaction force command value. The normal state calculation mode is a mode in which the reaction force command value is calculated in a non-keeping state in which the operation amount is not kept constant. The keeping state calculation mode is a mode in which the reaction force command value is calculated in a keeping state in which the operation amount is kept constant, and is a mode in which the reaction force command value having an absolute value smaller than an absolute value of the reaction force command value calculated in the normal state calculation mode is calculated. The reaction force command value calculation unit is configured to execute: a keeping state determination process for determining whether a keeping condition for detecting the keeping state is satisfied; and a calculation mode switching process for switching the calculation mode of the reaction force command value to the keeping state calculation mode when the keeping condition is satisfied. Each of the normal state calculation mode and the keeping state calculation mode has a relationship of the reaction force component with respect to the operation amount. An origin of the relationship in the keeping state calculation mode is shifted to a side of the operation amount at a time when determination is made that the keeping condition is satisfied compared to an origin of the relationship in the normal state calculation mode.

A further aspect of the present disclosure provides a steering control method for controlling a steering system of a vehicle. The steering system has a structure in which a power transmission path between an operation unit including an operating lever and configured to apply an operation reaction force to the operating lever according to an operation amount of the operating lever and a steering unit configured to steer a steered wheel is separated. The steering control method includes: calculating a reaction force command value that is a command value of the operation reaction force to reflect a reaction force component calculated based on a state variable obtained from the vehicle; and generating a control signal for operating the operation unit based on the reaction force command value. The calculating the reaction force command value includes a keeping state calculation mode and a normal state calculation mode as calculation modes of the reaction force command value. The normal state calculation mode is a mode in which the reaction force command value is calculated in a non-keeping state in which the operation amount is not kept constant. The keeping state calculation mode is a mode in which the reaction force command value is calculated in a keeping state in which the operation amount is kept constant, and is a mode in which the reaction force command value having an absolute value smaller than an absolute value of the reaction force command value calculated in the normal state calculation mode is calculated. The calculating the reaction force command value includes executing: a keeping state determination process for determining whether a keeping condition for detecting the keeping state is satisfied; and a calculation mode switching process for switching the calculation mode of the reaction force command value to the keeping state calculation mode when the keeping condition is satisfied. The keeping state calculation mode is configured such that a dead band that is a range in which the reaction force component does not change with respect to the operation amount is larger than a dead band in the normal state calculation mode.

Another aspect of the present disclosure provides a steering control method for controlling a steering system of a vehicle. The steering system has a structure in which a power transmission path between an operation unit including an operating lever and configured to apply an operation reaction force to the operating lever according to an operation amount of the operating lever and a steering unit configured to steer a steered wheel is separated. The steering control method includes: calculating a reaction force command value that is a command value of the operation reaction force to reflect a reaction force component calculated based on a state variable obtained from the vehicle; and generating a control signal for operating the operation unit based on the reaction force command value. The calculating the reaction force command value includes a keeping state calculation mode and a normal state calculation mode as calculation modes of the reaction force command value. The normal state calculation mode is a mode in which the reaction force command value is calculated in a non-keeping state in which the operation amount is not kept constant. The keeping state calculation mode is a mode in which the reaction force command value is calculated in a keeping state in which the operation amount is kept constant, and is a mode in which the reaction force command value having an absolute value smaller than an absolute value of the reaction force command value calculated in the normal state calculation mode is calculated. The calculating the reaction force command value includes executing: a keeping state determination process for determining whether a keeping condition for detecting the keeping state is satisfied; and a calculation mode switching process for switching the calculation mode of the reaction force command value to the keeping state calculation mode when the keeping condition is satisfied. Each of the normal state calculation mode and the keeping state calculation mode has a relationship of the reaction force component with respect to the operation amount. An origin of the relationship in the keeping state calculation mode is shifted to a side of the operation amount at a time when determination is made that the keeping condition is satisfied compared to an origin of the relationship in the normal state calculation mode.

BRIEF DESCRIPTION OF THE DRAWINGS

FIG. 5 is a flowchart showing an example of a processing procedure by an angle axial force calculation unit of a reaction torque command value calculation unit in FIG. 2.

MODES FOR CARRYING OUT THE INVENTION

First Embodiment

Figure 1:
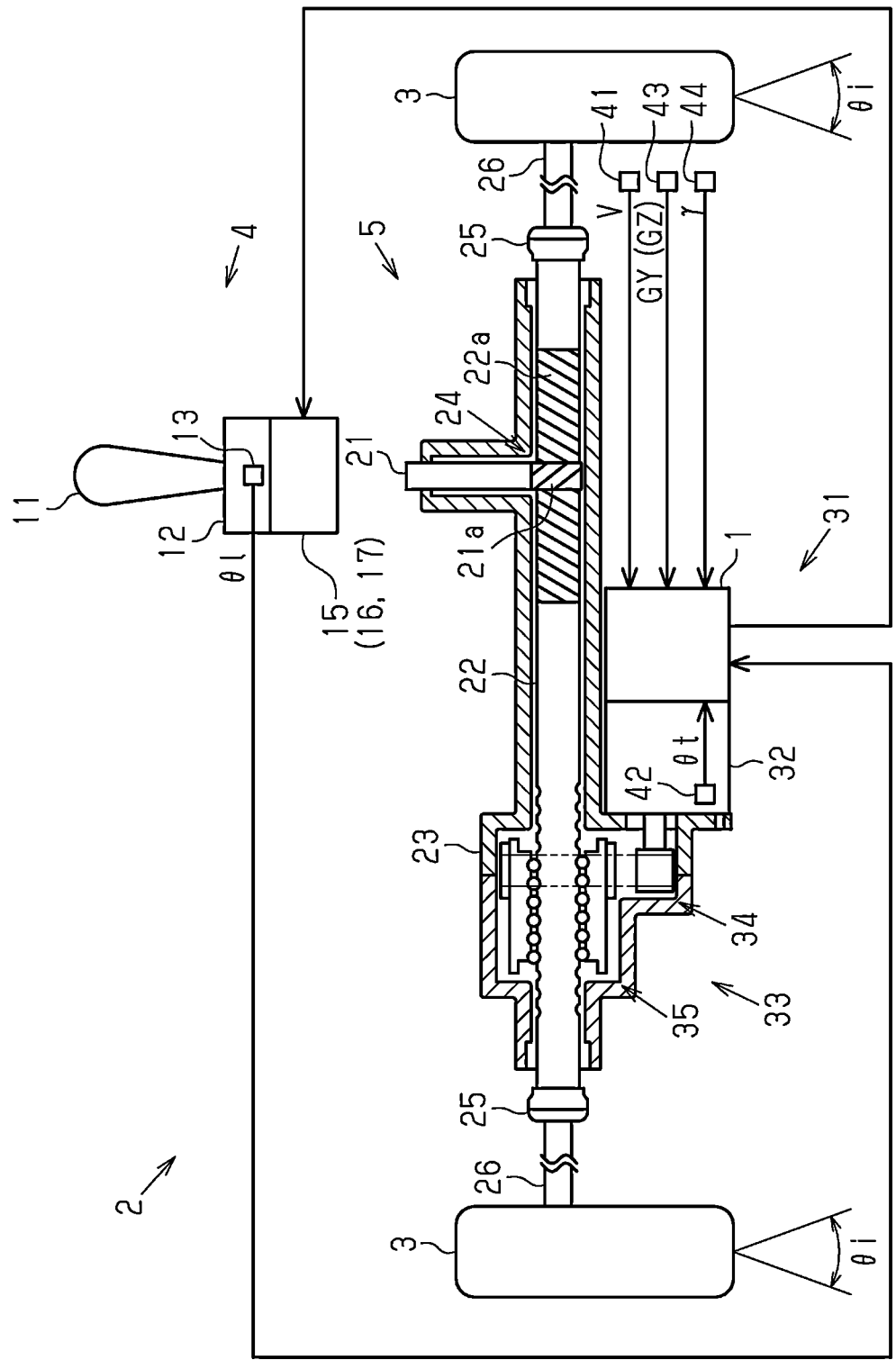
FIG. 1 is a schematic configuration diagram of a steering system and a steering control device that controls the steering system according to a first embodiment.

A first embodiment of a steering control device will be described below with reference to the drawings.
Overall Configuration As shown in FIG. 1, a steering control device 1 controls a steer-by-wire steering system 2. The steering system 2 changes the direction of travel of a vehicle by steering steered wheels 3 according to an operation by a driver. The steering system 2 includes an operation unit 4 that is operated by the driver, and a steering unit 5 that steers the steered wheels 3. The steering system 2 has a structure in which a power transmission path between the operation unit 4 and the steering unit 5 is mechanically separated.

The operation unit 4 includes an operating lever 11 that is operated by the driver, and a base 12 that tiltably supports the operating lever 11. The base 12 of the present embodiment supports the operating lever 11 in such a manner that the operating lever 11 is tiltable in a lateral direction of the vehicle, i.e., in a left-right direction, and the operating lever 11 is tilted in the left-right direction by an operation by the driver. That is, the amount of operation by the driver is represented by the tilt angle of the operating lever 11 (hereinafter referred to as lever tilt angle θl). In another embodiment, the base 12 may support the operating lever 11 in such a manner that the operating lever 11 is tiltable in a front-rear direction of the vehicle.

In the illustrated example, the operation unit 4 includes a tilt angle sensor 13 that detects the lever tilt angle θl. The lever tilt angle Cθl is detected as a positive value when the operating lever 11 is tilted to the right, and as a negative value when the operating lever 11 is tilted to the left, but this may be opposite.

The operation unit 4 further includes a reaction force actuator 15 that applies an operation reaction force that is a force against the operation on the operating lever 11 by the driver. In the illustrated example, the reaction force actuator 15 includes a reaction force motor 16 and a link mechanism 17 that transmits torque of the reaction force motor 16 to the operating lever 11. The link mechanism 17 is configured by, for example, connecting a plurality of gears and rotating shafts. The reaction force actuator 15 applies a reaction torque that is the operation reaction force to the operating lever 11 in such a manner that the rotation of the reaction force motor 16 is transmitted to the link mechanism 17 and the link mechanism 17 converts the rotation into a corresponding motion on the operating lever 11.

The steering unit 5 includes a pinion shaft 21, a rack shaft 22 connected to the pinion shaft 21, a rack housing 23 that reciprocably houses the rack shaft 22, and a rack and pinion mechanism 24 having the pinion shaft 21 and the rack shaft 22. The rack and pinion mechanism 24 is configured by meshing pinion teeth 21a formed on the pinion shaft 21 with rack teeth 22a formed on the rack shaft 22. The pinion shaft 21 therefore rotates according to the reciprocating motion of the rack shaft 22. Tie rods 26 are connected to both ends of the rack shaft 22 via ball joints 25. Distal ends of the tie rods 26 are connected to knuckles, not shown, with the steered wheels 3 attached thereto.

The steering unit 5 further includes a steering actuator 31 that applies a steering force, namely a force for steering the steered wheels 3, to the rack shaft 22. In the illustrated example, the steering actuator 31 includes a steering motor 32 and a power transmission mechanism 33 that transmits torque of the steering motor 32 to the rack shaft 22. The power transmission mechanism 33 includes a belt mechanism 34 and a ball screw mechanism 35. The steering actuator 31 transmits rotation of the steering motor 32 to the ball screw mechanism 35 via the belt mechanism 34, and the ball screw mechanism 35 converts the rotation into a reciprocating motion of the rack shaft 22. The steering actuator 31 thus applies a steering force to the steered wheels 3.

In the steering system 2 configured as described above, a steering force is applied from the steering actuator 31 according to the operation on the operating lever 11 by the driver. As a result, the rack shaft 22 reciprocates, and a steered angle θi of the steered wheels 3 is changed. That is, the steering actuator 31 steers the steered wheels 3 according to the driver's operation. At this time, a reaction force against the driver's operation is applied to the operating lever 11 from the reaction force actuator 15. That is, in the steering system 2, the force of the driver required to operate the operating lever 11 is changed by the reaction torque applied by the reaction force actuator 15.

The steering control device 1 is connected to the reaction force motor 16 and the steering motor 32 and controls actuation of the reaction force motor 16 and the steering motor 32. Detection results from various sensors are input to the steering control device 1. The various sensors include, for example, the tilt angle sensor 13, a vehicle speed sensor 41, a rotation angle sensor 42, an acceleration sensor 43, and a yaw rate sensor 44. The vehicle speed sensor 41 detects a vehicle speed V that is a travel speed of the vehicle. The rotation angle sensor 42 detects a rotation angle θt of a rotating shaft of the steering motor 32 as a relative angle within the range of 360°. The acceleration sensor 43 according to the present embodiment detects a lateral acceleration GY of the vehicle. In another embodiment, the acceleration sensor may detect a vertical acceleration GZ by detecting acceleration in a vertical direction as a positive or negative value. The acceleration sensor that detects the vertical acceleration GZ may be connected individually to the steering control device 1. The yaw rate sensor 44 detects a yaw rate γ of the vehicle. The detection results of these various sensors are examples of state variables. The steering control device 1 controls actuation of the steering motor 32 based on the received state variables.

Steering Control Device 1

Figure 2:
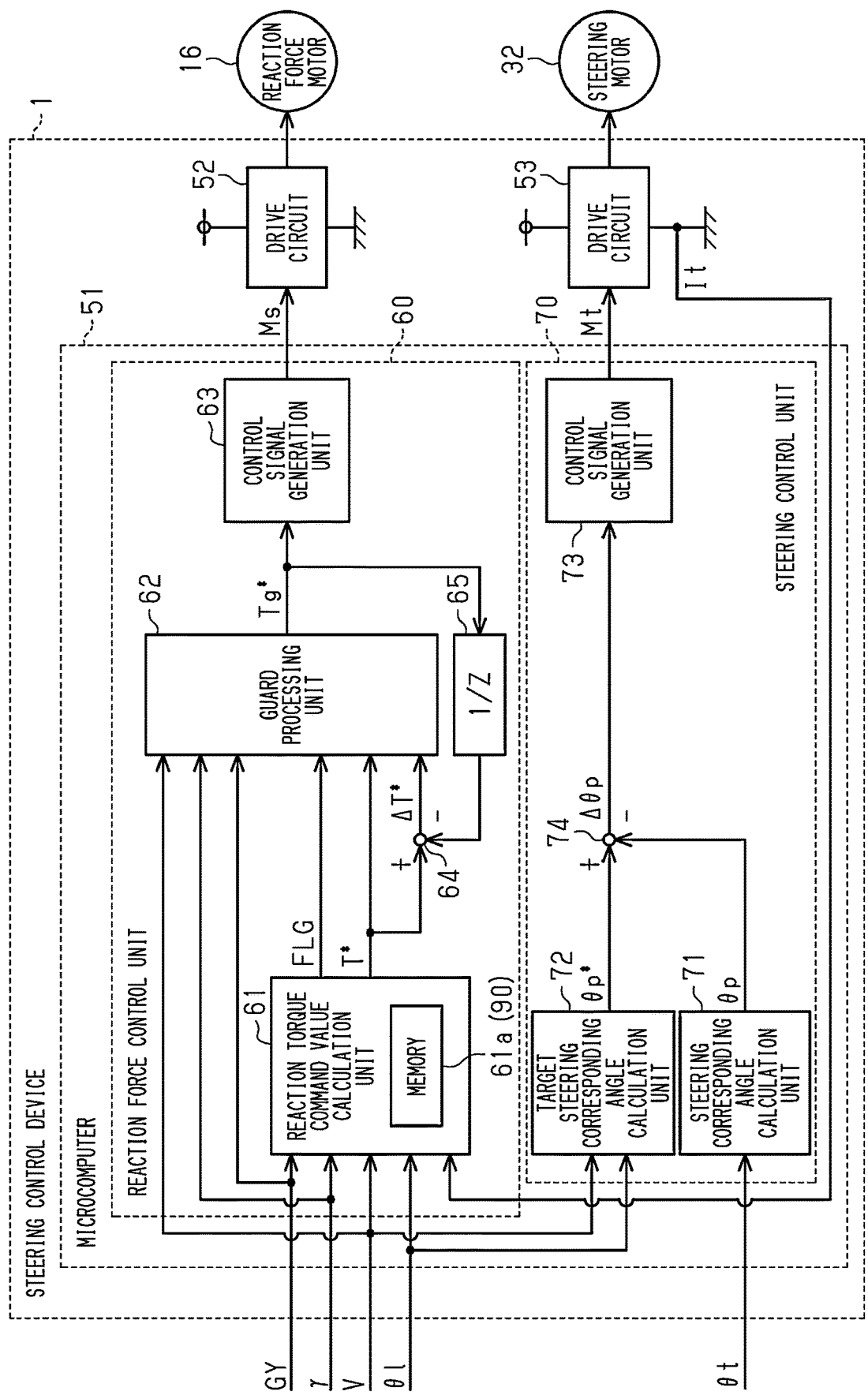
FIG. 2 is a block diagram of the steering control device in FIG. 1.

The configuration of the steering control device 1 will be described in detail below. As shown in FIG. 2, the steering control device 1 includes a microcomputer 51, a drive circuit 52, and a drive circuit 53. The microcomputer 51 outputs a control signal Ms and a control signal Mt. The drive circuit 52 supplies electric power to the reaction force motor 16 based on the control signal Ms. The drive circuit 53 supplies electric power to the steering motor 32 based on the control signal Mt.

The microcomputer 51 that is a processing circuit can be composed of (1) one or more processors that operate according to a computer program (software), (2) one or more dedicated hardware circuits such as an application-specific integrated circuit (ASIC) that execute at least part of various processes, or (3) a combination thereof. The processor includes a CPU and a memory such as RAM and ROM, and the memory stores program codes or commands configured to cause the CPU to execute processes. The memory, namely a non-transitory computer-readable medium, includes any available media that can be accessed by a general purpose or special purpose computer. Various types of control by the microcomputer 51 are executed by the CPU executing programs stored in the memory at a predetermined calculation cycle.

A typical PWM inverter including a plurality of switching elements such as FETs or IGBTs is used as each of the drive circuit 52 and the drive circuit 53. Each of the control signal Ms and the control signal Mt is a gate on/off signal that defines the on/off state of each switching element.

The microcomputer 51 outputs the control signal Ms to the drive circuit 52, so that electric power according to the control signal Ms is supplied from an in-vehicle power supply to the reaction force motor 16. As a result, the reaction force motor 16 rotates, and a reaction torque is applied to the operating lever 11 as described above. In this way, the steering control device 1 supplies electric power to the reaction force motor 16 to control motor torque generated by the reaction force motor 16, thereby applying a reaction torque to the operating lever 11. The microcomputer 51 outputs the control signal Mt to the drive circuit 53, so that electric power according to the control signal Mt is supplied from the in-vehicle power supply to the steering motor 32. As a result, the steering motor 32 rotates, and a steering force is applied to the steered wheels 3 as described above. In this way, the steering control device 1 supplies electric power to the steering motor 32 to control motor torque generated by the steering motor 32, thereby steering the steered wheels 3.

Microcomputer 51

The configuration of the microcomputer 51 will be described in detail below.

The microcomputer 51 outputs the control signal Ms and the control signal Mt by the following control blocks executing arithmetic processing at a predetermined calculation cycle. The microcomputer 51 receives the vehicle speed V, the lever tilt angle θl, the rotation angle θt, the lateral acceleration GY, and the yaw rate γ. The microcomputer 51 generates and outputs the control signal Ms and the control signal Mt based on these various state variables.

Specifically, the microcomputer 51 includes a reaction force control unit 60 that generates and outputs the control signal Ms, and a steering control unit 70 that generates and outputs the control signal Mt. The reaction force control unit 60 includes a reaction torque command value calculation unit 61, a guard processing unit 62, and a control signal generation unit 63. The steering control unit 70 includes a steering corresponding angle calculation unit 71, a target steering corresponding angle calculation unit 72, and a control signal generation unit 73.

Reaction Force Control Unit 60

The reaction torque command value calculation unit 61 receives the vehicle speed V, the lever tilt angle θl, the lateral acceleration GY, the yaw rate γ, and an actual steering current value It. The reaction torque command value calculation unit 61 calculates a reaction torque command value T* as a reaction force command value that is a command value for the reaction torque based on these various state variables. The actual steering current value It is information obtained from the drive circuit 53 provided in association with the steering motor 32. The drive circuit 53 includes a current sensor, not shown. The current sensor detects the actual steering current value It obtained from the value of a current of each phase of the steering motor 32 that flows through a connection line between the drive circuit 53 and a motor coil of each phase of the steering motor 32. For example, the current sensor acquires, as a current, a voltage drop across a shunt resistor connected to a source side of each switching element in the PWM inverter included in the drive circuit 53. The calculation process for the reaction torque command value T* by the reaction torque command value calculation unit 61 will be described later.

Figure 3:
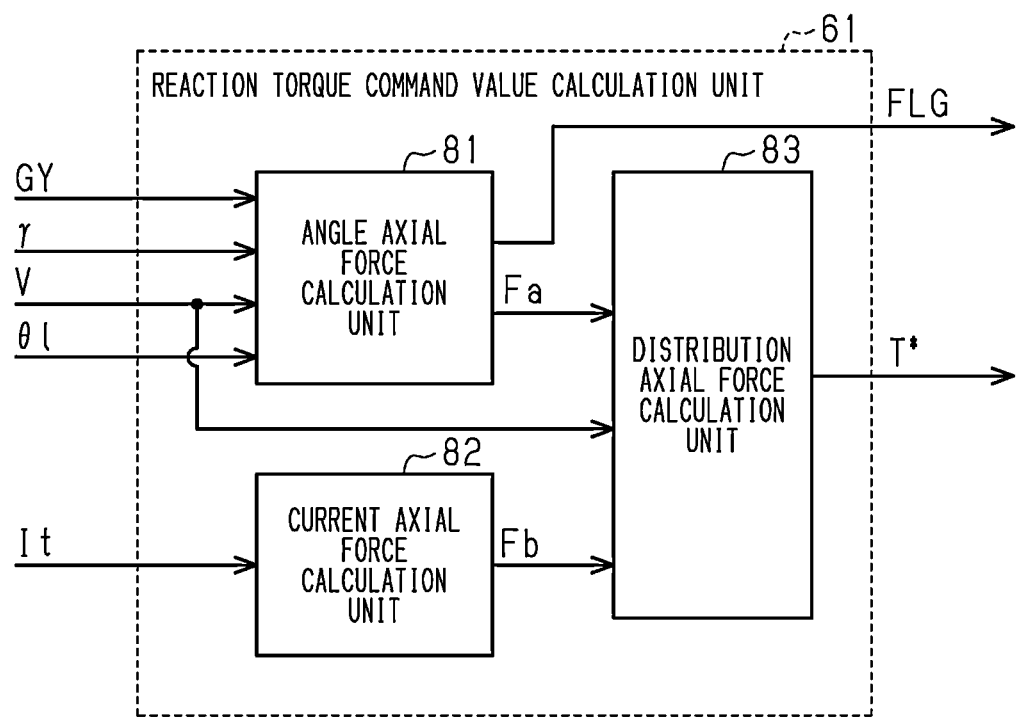
FIG. 3 is a block diagram of reaction torque command value calculation in FIG. 2.

Specifically, as shown in FIG. 3, the reaction torque command value calculation unit 61 includes an angle axial force calculation unit 81, a current axial force calculation unit 82, and a distribution axial force calculation unit 83.

The angle axial force calculation unit 81 receives the vehicle speed V, the lever tilt angle θl, the lateral acceleration GY, and the yaw rate γ. The angle axial force calculation unit 81 calculates an angle axial force Fa based on these various state variables. The angle axial force Fa is an ideal value of an axial force defined by a vehicle model set as desired. The angle axial force Fa is an axial force that does not reflect road surface information. The road surface information includes information on minute irregularities that do not affect the lateral behavior of the vehicle, steps that affect the lateral behavior of the vehicle, etc. The angle axial force calculation unit 81 executes calculation so that, for example, the absolute value of the angle axial force Fa increases as the absolute value of the lever tilt angle θl increases. The angle axial force calculation unit 81 also executes calculation so that, for example, the absolute value of the angle axial force Fa increases as the vehicle speed V increases. The angle axial force Fa includes a torque dimension (N·m). The angle axial force calculation unit 81 calculates a keeping FLG described later in the calculation of the angle axial force Fa. The calculation process for the angle axial force Fa by the angle axial force calculation unit 81 will be described later. The angle axial force Fa is output to the distribution axial force calculation unit 83. The keeping FLG is output to the guard processing unit 62. In the present embodiment, the angle axial force Fa is an example of a reaction force component. That is, the calculation process executed by the angle axial force calculation unit 81 corresponds to a reaction force component calculation process.

The current axial force calculation unit 82 receives the actual steering current value It. The current axial force calculation unit 82 calculates a current axial force Fb based on the actual steering current value It. The current axial force Fb is an estimated value of an axial force that actually acts on the rack shaft 22 that operates to steer the steered wheels 3, i.e., an axial force that is actually transmitted to the rack shaft 22. The current axial force Fb is an axial force that reflects the road surface information. For example, the current axial force calculation unit 82 calculates the current axial force Fb on the assumption that the torque applied to the rack shaft 22 by the steering motor 32 and the torque corresponding to the force applied to the rack shaft 22 through the steered wheels 3 are balanced. That is, the current axial force calculation unit 82 executes calculation so that the absolute value of the current axial force Fb increases as the absolute value of the actual steering current value It increases. The current axial force Fb includes a torque dimension (N·m). The current axial force Fb is output to the distribution axial force calculation unit 83. In the present embodiment, the current axial force Fb is an example of the reaction force component. That is, the calculation process executed by the current axial force calculation unit 82 corresponds to the reaction force component calculation process.

The distribution axial force calculation unit 83 receives the vehicle speed V, the angle axial force Fa, and the current axial force Fb. The distribution axial force calculation unit 83 calculates the reaction torque command value T* based on these various state variables. The distribution axial force calculation unit 83 calculates the reaction torque command value T* by adding together the angle axial force Fa and the current axial force Fb at a predetermined distribution ratio. That is, the distribution axial force calculation unit 83, i.e., the reaction torque command value calculation unit 61, calculates the reaction torque command value T* so that the angle axial force Fa and the current axial force Fb are reflected in the reaction torque command value T*. The distribution axial force calculation unit 83 adjusts the distribution ratio between the angle axial force Fa and the current axial force Fb based on the vehicle speed V. For example, the distribution axial force calculation unit 83 reduces the distribution ratio of the angle axial force Fa and increases the distribution ratio of the current axial force Fb as the vehicle speed V increases. The reaction torque command value T* is output to the guard processing unit 62. In the present embodiment, the calculation process executed by the distribution axial force calculation unit 83 corresponds to a reaction force command value calculation process.

Returning to the description in FIG. 2, the guard processing unit 62 receives the vehicle speed V, the lateral acceleration GY, the yaw rate γ, the keeping FLG, the reaction torque command value T*, and a difference ΔT*. The guard processing unit 62 calculates a reaction torque command value Tg* after a guard process based on these various state variables. The difference ΔT* is a value obtained through a subtractor 64. The subtractor 64 receives the reaction torque command value T* that is a current value calculated in the current cycle, and the reaction torque command value Tg* after the guard process that is a previous value calculated in a cycle immediately preceding the current cycle (one cycle ago). The reaction torque command value Tg* in the immediately preceding cycle is held by a previous value holding unit 65. The subtractor 64 calculates the difference ΔT* by subtracting the reaction torque command value Tg* in the immediately preceding cycle from the reaction torque command value T*.

The guard processing unit 62 calculates the reaction torque command value Tg* after the guard process in which the reaction torque command value T* is limited to limit the difference ΔT* to a difference upper limit value ΔT*lim or smaller. The difference upper limit value ΔT*lim is a value set according to the vehicle speed V, the lateral acceleration GY, and the yaw rate γ. The guard process for the reaction torque command value Tg* by the guard processing unit 62 will be described later. The reaction torque command value Tg* is output to the control signal generation unit 63.

The control signal generation unit 63 receives the reaction torque command value Tg*. The control signal generation unit 63 generates the control signal Ms based on this state variable. The control signal generation unit 63 executes F/B calculation based on the reaction torque command value Tg* to calculate target reaction torque. As an example, PID control calculation is used for the F/B calculation. However, the F/B calculation is not limited to this, and PI control calculation etc. may be used. The control signal generation unit 63 then uses a desired known technology to generate the control signal Ms that causes the reaction force motor 16 to generate the target reaction torque.

As described above, the reaction torque command value Tg* used in the F/B calculation is limited so that the difference ΔT* is equal to or smaller than the difference upper limit value ΔT*lim. That is, the control signal generation unit 63 generates the control signal Ms to suppress a sudden change in the reaction torque.

Steering Control Unit 70

The steering corresponding angle calculation unit 71 receives the rotation angle θt. The steering corresponding angle calculation unit 71 calculates an integrated angle by counting the number of rotations of the steering motor 32 from, for example, a midpoint and integrating the rotation angle θt with the midpoint as zero degrees. The steering corresponding angle calculation unit 71 then calculates a steering corresponding angle θp by multiplying this integrated angle by a conversion factor based on the reduction ratio of the belt mechanism 34, the lead of the ball screw mechanism 35, and the rotational speed ratio of the rack and pinion mechanism 24. The steering corresponding angle θp is output to the control signal generation unit 73 via a subtractor 74. In the present embodiment, the steering corresponding angle θp corresponds to a pinion angle that is the rotation angle of the pinion shaft 21, and the midpoint is the rotation angle of the pinion shaft 21 when the vehicle travels straight. As described above, the pinion shaft 21 rotates according to the reciprocating motion of the rack shaft 22. Therefore, the rotation angle of the pinion shaft 21, i.e., the steering corresponding angle θp, corresponds to a steering corresponding value that is an actual value of a convertible value that can be converted into the steered angle θi of the steered wheels 3, and the steering corresponding angle calculation unit 71 corresponds to a steering corresponding value calculation unit.

The target steering corresponding angle calculation unit 72 receives the vehicle speed V and the lever tilt angle θl. The target steering corresponding angle calculation unit 72 calculates a target steering corresponding angle θp* that is a target value of the steering corresponding angle θp based on these state variables. The target steering corresponding angle θp* is output to the control signal generation unit 73 via the subtractor 74. In the present embodiment, the target steering corresponding angle θp* corresponds to a target steering corresponding value that is a target value of a convertible value that can be converted into the steered angle θi of the steered wheels 3, and the target steering corresponding angle calculation unit 72 corresponds to a target steering corresponding value calculation unit.

The control signal generation unit 73 receives a deviation Δθp. The deviation Δθp is a value obtained through the subtractor 74. The subtractor 74 receives the target steering corresponding angle θp* and the steering corresponding angle θp. The subtractor 74 subtracts the steering corresponding angle θp from the target steering corresponding angle θp* to calculate the deviation Δθp.

The control signal generation unit 73 generates the control signal Mt based on this state variable. The control signal generation unit 73 executes F/B calculation based on the deviation Δθp to calculate target steering torque. As an example, PID control calculation is used for the F/B calculation. However, the F/B calculation is not limited to this, and PI control calculation etc. may be used. An F/B control unit then uses a desired known technology to generate the control signal Mt that causes the steering motor 32 to generate the target steering torque.

Reaction Torque Command Value Calculation Unit 61

The calculation process for the reaction torque command value T* by the reaction torque command value calculation unit 61 will be described in detail.

The reaction torque command value calculation unit 61 calculates the reaction torque command value T* by reflecting the angle axial force Fa calculated by the angle axial force calculation unit 81 and the current axial force Fb calculated by the current axial force calculation unit 82 in the reaction torque command value T* through the distribution axial force calculation unit 83. That is, the reaction torque command value calculation unit 61 calculates the angle axial force Fa through the calculation process by the angle axial force calculation unit 81.

Specifically, as shown in FIG. 3, the angle axial force calculation unit 81 executes a keeping state determination process for determining whether a keeping condition is satisfied, and a termination condition determination process for determining whether a termination condition is satisfied. As described later, the keeping condition is a condition for determining whether the calculation mode of the reaction torque command value T* for the operation amount of the operating lever 11 is to be switched to a keeping state calculation mode. The keeping condition is set from the viewpoint that a keeping state in which the lever tilt angle θl that is the operation amount is kept constant can be detected. For example, the keeping state includes a state in which the operating lever 11 is tilted and kept. The termination condition is a condition for determining whether the calculation mode of the reaction torque command value T* for the operation amount of the operating lever 11 is to be switched to a normal state calculation mode after being switched to the keeping state calculation mode. The termination condition is set from the viewpoint that a non-keeping state in which the lever tilt angle θl that is the operation amount is not kept constant can be detected.

The angle axial force calculation unit 81 executes a process of calculating the angle axial force Fa based on the lever tilt angle θl and the vehicle speed V in the keeping state calculation mode or the normal state calculation mode according to whether the keeping condition or the termination condition is satisfied. After the start of the calculation process for the angle axial force Fa, the angle axial force calculation unit 81 executes the process in the normal state calculation mode until the keeping condition is satisfied. After the keeping condition is satisfied, the angle axial force calculation unit 81 executes the process in the keeping state calculation mode. The angle axial force calculation unit 81 executes the process in the keeping state calculation mode during a period from the time when the keeping condition is no longer satisfied to the time when the termination condition is satisfied. The angle axial force calculation unit 81 executes the process in the normal state calculation mode after the keeping condition is no longer satisfied and then the termination condition is satisfied.

As shown in FIG. 2, the reaction torque command value calculation unit 61 includes a memory 61*a*. The memory 61*a* stores a plurality of maps 90 that is calculation information to be used when the reaction torque command value T* is calculated. The map 90 includes a normal state map 91 and a keeping state map 92 to be used when the angle axial force calculation unit 81 calculates the angle axial force Fa. The normal state map 91 is normal state calculation information to be used during the calculation in the normal state calculation mode. The keeping state map 92 is keeping state calculation information to be used during the calculation in the keeping state calculation mode.

Figure 4A:
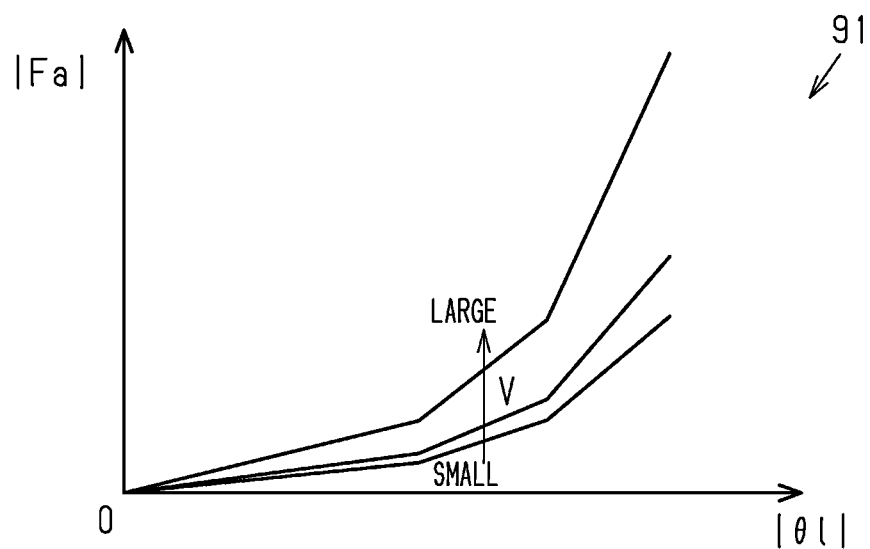
FIG. 4A is a diagram showing an example of a normal state map provided in the steering control device in FIG. 1.
Figure 4B:
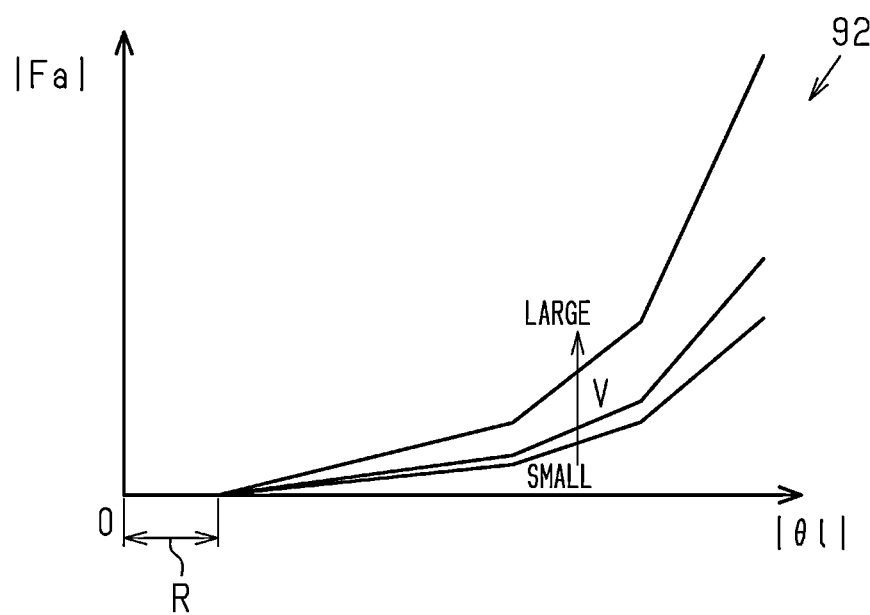
FIG. 4B is a diagram showing an example of a keeping state map provided in the steering control device in FIG. 1.

As shown in FIGS. 4A and 4B, the normal state map 91 and the keeping state map 92 show the relationships among the lever tilt angle θl, the vehicle speed V, and the angle axial force Fa. That is, the normal state map 91 and the keeping state map 92 are three-dimensional maps showing the relationships of the angle axial force Fa with respect to the lever tilt angle θl and the vehicle speed V. In the illustrated example, in both the normal state map 91 and the keeping state map 92, the angle axial force Fa is zero when the lever tilt angle θl is zero. Both the normal state map 91 and the keeping state map 92 are set so that the absolute value of the angle axial force Fa increases as the absolute value of the lever tilt angle θl increases. Both the normal state map 91 and the keeping state map 92 are set so that the absolute value of the angle axial force Fa increases as the vehicle speed V increases. The keeping state map 92 has a dead band R in which the absolute value of the angle axial force Fa is kept at zero even when the lever tilt angle θl changes. The normal state map 91 does not have a dead band for the angle axial force Fa with respect to a change in the lever tilt angle θl. That is, the range of the dead band R in the keeping state map 92 is set larger than the range in the normal state map 91 in which the absolute value of the angle axial force Fa is kept at zero even when the lever tilt angle θl changes. The absolute value of the angle axial force Fa in the keeping state map 92 is set to a value that is shifted to a positive value side that is the right side in the figure by an amount corresponding to the dead band R while keeping the tendency set in the normal state map 91. As a result, the absolute value of the angle axial force Fa in the keeping state map 92 is smaller than the absolute value of the angle axial force Fa in the normal state map 91 at any lever tilt angle θl and at any vehicle speed V. That is, the absolute value of the reaction torque command value T* obtained by reflecting the angle axial force Fa in the keeping state map 92 is smaller than the absolute value of the reaction torque command value T* obtained by reflecting the angle axial force Fa in the normal state map 91.

In the normal state calculation mode, the angle axial force calculation unit 81 calculates the angle axial force Fa according to the lever tilt angle θl and the vehicle speed V by referring to the normal state map 91. In the keeping state calculation mode, the angle axial force calculation unit 81 calculates the angle axial force Fa according to the lever tilt angle θl and the vehicle speed V by referring to the keeping state map 92. That is, the angle axial force calculation unit 81 switches the map for use between the normal state calculation mode and the keeping state calculation mode. In the keeping state calculation mode, the angle axial force calculation unit 81 thus calculates the angle axial force Fa having an absolute value smaller than that of the angle axial force Fa calculated in the normal state calculation mode. That is, in the keeping state calculation mode, the reaction torque command value calculation unit 61 calculates the reaction torque command value T* having an absolute value smaller than that of the reaction torque command value T* calculated in the normal state calculation mode.

The angle axial force calculation unit 81 sets the keeping FLG as information indicating whether the keeping condition or the termination condition is satisfied. The keeping FLG is set to "1" when the keeping condition is satisfied. When the keeping FLG is set to "1" and the termination condition is satisfied after the keeping condition is no longer satisfied, the keeping FLG is set to "0 (zero)." When the keeping FLG is set to "1" and the keeping condition is no longer satisfied, the keeping FLG is set to "1" until the termination condition is satisfied.

Keeping Condition and Termination Condition

The angle axial force calculation unit 81 determines that the keeping condition is satisfied when the following condition is satisfied.

(a1) An operating speed ωl of the operating lever 11 is lower than a keeping state threshold ωltha.

The keeping state threshold ωltha is a value within a range in which determination can be made that the driver is holding the operating lever 11. The keeping state threshold ωltha is calculated as a value that changes based on the vehicle speed V, the lateral acceleration GY, and the yaw rate γ. The angle axial force calculation unit 81 of the present embodiment calculates the operating speed ωl by differentiation of the lever tilt angle θl. In another embodiment, the operation unit 4 may be provided with a speed sensor, and the operating speed ωl may be detected from the speed sensor.

As shown in (a1), the keeping condition includes a condition based on a result of comparison between an operation amount parameter indicating a change state of the operation amount of the operating lever 11 and a threshold. The threshold of the keeping condition is calculated based on travel parameters indicating the travel conditions of the vehicle. In (a1), the travel parameters are the vehicle speed V, the lateral acceleration GY, and the yaw rate γ.

The angle axial force calculation unit 81 determines that the termination condition is satisfied when the following condition is satisfied.

(b1) The operating speed ωl of the operating lever 11 is equal to or greater than a termination state threshold ωlthb.

The termination state threshold ωlthb is a value within a range in which determination can be made that the driver is not holding the operating lever 11. The termination state threshold ωlthb is calculated as a value that changes based on the vehicle speed V, the lateral acceleration GY, and the yaw rate γ. The absolute value of the termination state threshold ωlthb is set greater than the absolute value of the keeping state threshold ωltha. That is, intermediate values that do not belong to either of the termination state threshold ωlthb and the keeping state threshold ωltha are included between them. These intermediate values are values that can be used to determine the period until the termination condition is satisfied when the keeping condition is no longer satisfied while the keeping FLG is set to "1".

As shown in (b1), the termination condition includes a condition based on a result of comparison between an operation amount parameter indicating a change state of the operation amount of the operating lever 11 and a threshold. The threshold of the termination condition is calculated based on travel parameters indicating the travel conditions of the vehicle. In (b1), the travel parameters are the vehicle speed V, the lateral acceleration GY, and the yaw rate γ.

Calculation of Angle Axial Force Fa

An example of a processing procedure in which the angle axial force calculation unit 81 of the reaction torque command value calculation unit 61 calculates the angle axial force Fa will be described with reference to a flowchart shown in FIG. 5.

As shown in the figure, when the angle axial force calculation unit 81 acquires various state variables (step 101), the angle axial force calculation unit 81 calculates the operating speed ωl of the operating lever 11 (step 102). Next, the angle axial force calculation unit 81 determines whether the keeping condition is satisfied (step 103). In step 103, the angle axial force calculation unit 81 calculates the keeping state threshold ωltha based on the vehicle speed V, the lateral acceleration GY, and the yaw rate γ, and determines whether the operating speed ωl is lower than the keeping state threshold ωltha.

When determination is made that the keeping condition is satisfied because the operating speed ωl is lower than the keeping state threshold ωltha (step 103: YES), the angle axial force calculation unit 81 sets the keeping FLG to "1" (step 104). Next, the angle axial force calculation unit 81 calculates the angle axial force Fa using the keeping state map 92 (step 105), and ends the process. The process of step 103 corresponds to the keeping state determination process, and the process of step 104 corresponds to a calculation mode switching process.

When determination is made that the keeping condition is not satisfied because the operating speed ωl is equal to or greater than the keeping state threshold ωltha (step 103: NO), the angle axial force calculation unit 81 determines whether the keeping FLG is "1" (step 106). When the keeping FLG is "1" (step 106: YES), the angle axial force calculation unit 81 determines whether the termination condition is satisfied (step 107). In step 107, the angle axial force calculation unit 81 calculates the termination state threshold ωlthb based on the vehicle speed V, the lateral acceleration GY, and the yaw rate γ, and determines whether the operating speed ωl is equal to or greater than the termination state threshold ωlthb. When determination is made that the termination condition is not satisfied because the operating speed ωl is not equal to or greater than the termination state threshold ωlthb (step 107: NO), the angle axial force calculation unit 81 proceeds to the process of step 105 and executes the corresponding process.

When determination is made that the termination condition is satisfied because the operating speed ωl is equal to or greater than the termination state threshold ωlthb (step 107: YES), the angle axial force calculation unit 81 sets the keeping FLG to "0 (zero)" (step 108). Next, the angle axial force calculation unit 81 calculates the angle axial force Fa using the normal state map 91 (step 109), and ends the process. The processes of steps 103, 106, 107 correspond to a termination state determination process, and the process of step 108 corresponds to the calculation mode switching process.

Guard Processing Unit 62

The guard process for the reaction torque command value Tg* by the guard processing unit 62 will be described.

As shown in FIG. 2, the guard processing unit 62 executes the guard process for limiting the reaction torque command value T* based on the absolute value of the difference ΔT*. The execution condition as to whether to execute the guard process includes a condition based on a result of comparison between the difference ΔT* and the difference upper limit value ΔT*lim. The guard processing unit 62 executes an upper limit value calculation process for calculating the difference upper limit value ΔT*lim based on the vehicle speed V, the lateral acceleration GY, and the yaw rate γ.

In the upper limit speed calculation process, the guard processing unit 62 of the present embodiment calculates the difference upper limit value ΔT*lim according to the travel conditions of the vehicle.

Specifically, the reaction torque command value T* may change due to a change in the calculation mode of the angle axial force calculation unit 81. In consideration of such a situation, the guard processing unit 62 calculates the difference upper limit value ΔT*lim according to the travel conditions of the vehicle when the calculation mode is switched between the normal state calculation mode and the keeping state calculation mode. The guard processing unit 62 determines whether the calculation mode is switched between the normal state calculation mode and the keeping state calculation mode based on the keeping FLG.

When determination is made that the calculation mode is switched between the normal state calculation mode and the keeping state calculation mode, the guard processing unit 62 calculates the difference upper limit value ΔT*lim based on the vehicle speed V, the lateral acceleration GY, and the yaw rate γ. For example, the guard processing unit 62 includes a map or a function indicating the relationship among the vehicle speed V, the lateral acceleration GY, the yaw rate γ, and the difference upper limit value ΔT*lim, and calculates the difference upper limit value ΔT*lim by referring to the map or the function.

In the guard process, the guard processing unit 62 compares the absolute value of the input difference ΔT* and the difference upper limit value ΔT*lim. When the absolute value of the difference ΔT* is equal to or smaller than the difference upper limit value ΔT*lim, the guard processing unit 62 outputs the input reaction torque command value T* as it is to the control signal generation unit 63 as the reaction torque command value Tg* after the guard process. When the absolute value of the difference ΔT* is greater than the difference upper limit value ΔT*lim, the guard processing unit 62 outputs a value obtained by limiting the absolute value of the input reaction torque command value T* to the control signal generation unit 63 as the reaction torque command value Tg* after the guard process. In this case, the sign of the reaction torque command value Tg* is kept to be the sign of the input reaction torque command value T*, and the absolute value of the reaction torque command value Tg* is limited to a value obtained by adding the difference upper limit value ΔT*lim to the reaction torque command value Tg* in the immediately preceding cycle.

When the guard processing unit 62 of the present embodiment determines that the calculation mode is not switched, the guard processing unit 62 outputs the input reaction torque command value T* as it is to the control signal generation unit 63 as the reaction torque command value Tg* after the guard process. In another embodiment, in the guard process in such a case, the absolute value of the input difference ΔT* and the difference upper limit value ΔT*lim may be compared and the absolute value of the input reaction torque command value T* may be limited based on the result.

Guard Process

An example of a processing procedure in which the guard processing unit 62 executes the guard process on the reaction torque command value T* will be described with reference to a flowchart shown in FIG. 6.

Figure 6:
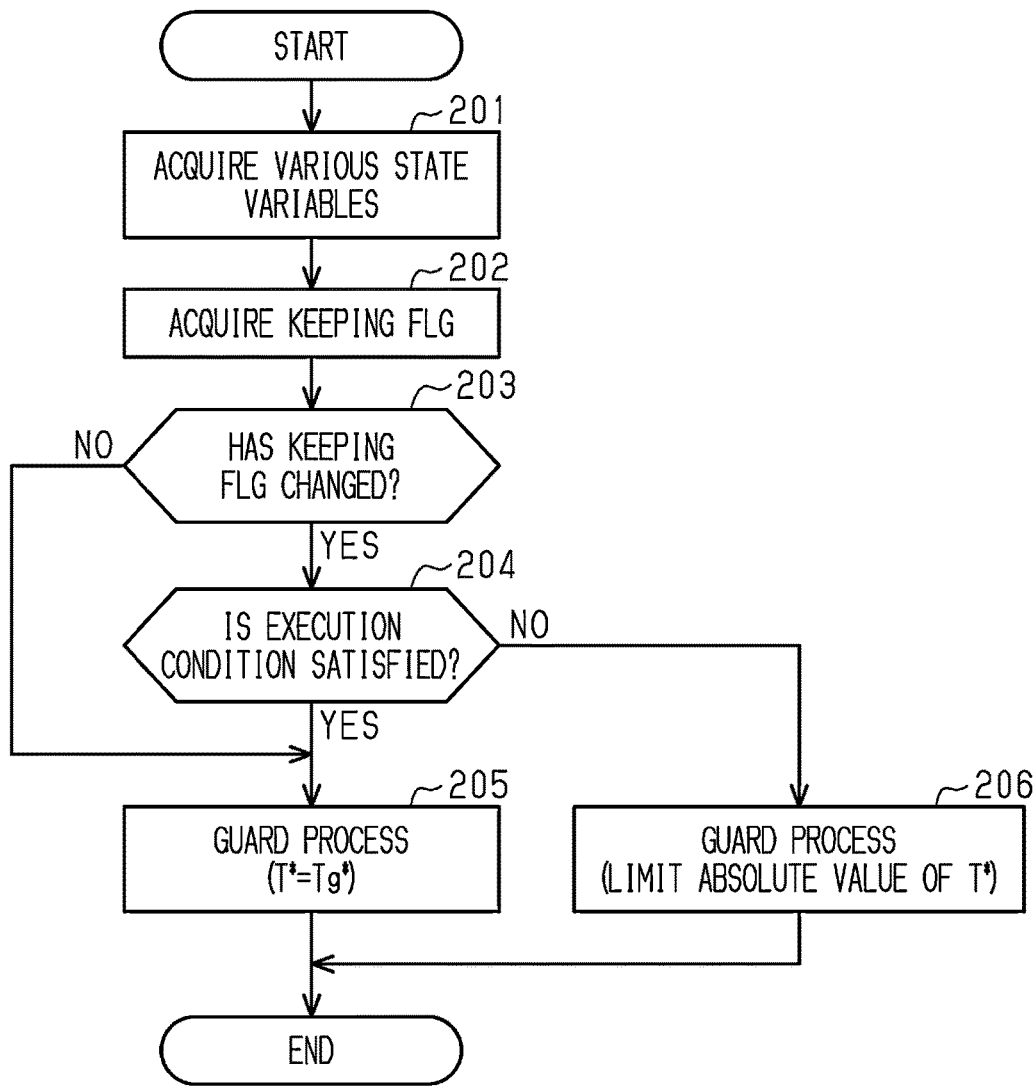
FIG. 6 is a flowchart showing an example of a processing procedure of a guard process executed by a guard processing unit in FIG. 2.

As shown in FIG. 6, the guard processing unit 62 acquires various state variables (step 201), and acquires the keeping FLG (step 202). Next, the guard processing unit 62 determines whether the keeping FLG has changed (step 203). In step 203, the guard processing unit 62 determines whether the current value of the keeping FLG acquired in the current cycle is different from the previous value of the keeping FLG acquired in the immediately preceding cycle (one cycle ago).

When determination is made that the keeping FLG has changed because the value of the keeping FLG acquired in the current cycle is different from the value of the keeping FLG acquired in the immediately preceding cycle (step 203: YES), the guard processing unit 62 determines whether the execution condition is satisfied (step 204). In step 204, the guard processing unit 62 calculates the difference upper limit value ΔT*lim based on the vehicle speed V, the lateral acceleration GY, and the yaw rate γ, and determines whether the absolute value of the difference ΔT* is equal to or smaller than the difference upper limit value ΔT*lim.

When determination is made that the execution condition is satisfied because the absolute value of the difference ΔT* is equal to or smaller than the difference upper limit value ΔT*lim (step 204: YES), the guard processing unit 62 outputs the reaction torque command value T* as it is as the reaction torque command value Tg* (step 205), and ends the process.

When determination is made that the execution condition is not satisfied because the absolute value of the difference ΔT* is greater than the difference upper limit value ΔT*lim (step 204: NO), the guard processing unit 62 outputs a value obtained by limiting the absolute value of the reaction torque command value T* as the reaction torque command value Tg* (step 206), and ends the process. In step 206, the guard processing unit 62 keeps the sign of the reaction torque command value T*, and limits the absolute value to a value obtained by adding the difference upper limit value ΔT*lim to the reaction torque command value Tg* in the immediately preceding cycle. In the present embodiment, the processes of steps 205, 206 correspond to the guard process.

Next, the functions and effects of the present embodiment will be described.

(1-1) When the keeping condition is satisfied because the operation amount of the operating lever 11 is kept constant by the driver, the reaction torque command value calculation unit 61 executes the calculation mode switching process for switching to the keeping state calculation mode. Therefore, when the operation amount of the operating lever 11 is kept constant by the driver, the absolute value of the reaction torque corresponding to the operation amount becomes smaller than that in the normal state calculation mode. In this case, when the driver keeps the constant operation amount of the operating lever 11, the force continuously applied to the operating lever 11 becomes smaller than that in the non-keeping state. This is effective in reducing the burden on the driver.

(1-2) When the keeping condition is satisfied, the reaction torque command value calculation unit 61 switches the map to be used when calculating the angle axial force Fa from that in the normal state calculation mode through the calculation mode switching process. Therefore, when the operation amount of the operating lever 11 is kept constant by the driver, the reaction torque command value calculation unit 61 can easily calculate a value having a smaller absolute value than that in the normal state calculation mode as the reaction torque corresponding to the operation amount.

(1-3) The reaction torque command value calculation unit 61 determines whether the keeping condition is satisfied based on the result of comparison between the operating speed ωl indicating the change state of the operation amount of the operating lever 11 and the keeping state threshold ωltha. This is effective in optimizing the situation for switching to the keeping state calculation mode.

(1-4) The reaction torque command value calculation unit 61 calculates the keeping state threshold ωltha based on the vehicle speed V, the lateral acceleration GY, and the yaw rate γ indicating the travel conditions of the vehicle. This is effective in optimizing the situation for switching to the keeping state calculation mode.

(1-5) The reaction torque command value calculation unit 61 uses the vehicle speed V, the lateral acceleration GY, and the yaw rate γ that are information generally acquirable from any vehicle regardless of the type of vehicle to determine whether the keeping condition is satisfied. In this case, the scale of changes required in the configuration of the steering control device 1 to realize the determination as to whether the keeping condition is satisfied is reduced.

(1-6) The guard processing unit 62 can limit the amount of change in the reaction torque command value T* to the difference upper limit value ΔT*lim or smaller through the guard process. Therefore, when switching to the keeping state calculation mode, the sudden change in the reaction torque command value T* is suppressed. Thus, when switching to the keeping state calculation mode, the driver's discomfort is reduced. The same applies when switching to the normal state calculation mode.

(1-7) The guard processing unit 62 calculates the difference upper limit value ΔT*lim based on the vehicle speed V, the lateral acceleration GY, and the yaw rate γ indicating the travel conditions of the vehicle. Thus, when switching to the keeping state calculation mode, the driver's discomfort can be reduced appropriately. The same applies when switching to the normal state calculation mode.

(1-8) In the keeping state calculation mode, the reaction torque command value calculation unit 61 executes calculation so that the absolute value of the angle axial force Fa out of the angle axial force Fa and the current axial force Fb is smaller than that in the normal state calculation mode. In this case, the current axial force Fb can be extracted as a reaction force component whose absolute value need not be made smaller than that in the non-keeping state. This is effective in optimizing the reaction torque command value T*.

Second Embodiment

A second embodiment of the steering control device will be described below with reference to the drawings. For convenience of description, the same configurations as those in the first embodiment are denoted by the same signs as those in the first embodiment, and description thereof will be omitted.

Figure 7A:
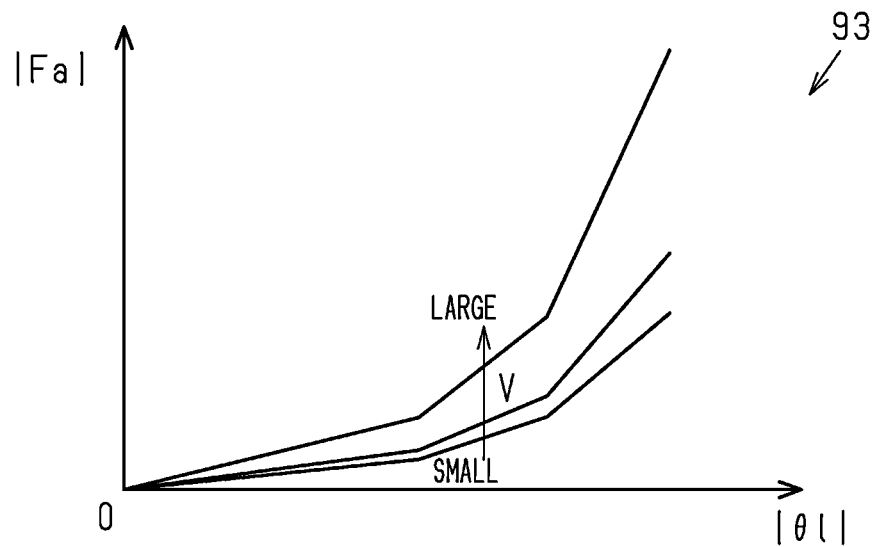
FIG. 7A is a diagram showing an example of a normal state map provided in a steering control device according to a second embodiment.
Figure 7B:
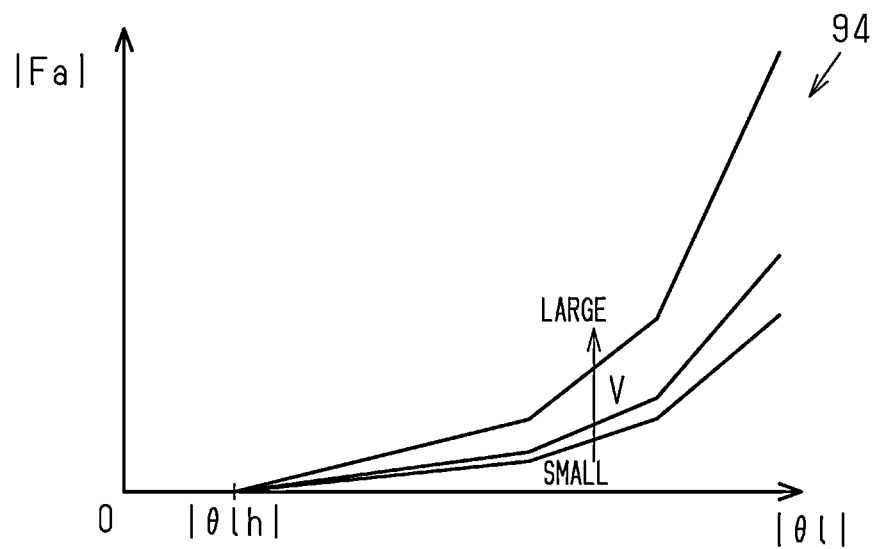
FIG. 7B is a diagram showing an example of a keeping state map provided in the steering control device according to the second embodiment.

As shown in FIGS. 7A and 7B, out of a normal state map 93 and a keeping state map 94 of the present embodiment, the normal state map 93 has the same configuration as the normal state map 91 of the first embodiment. The keeping state map 94 may have a configuration different from that of the keeping state map 92 of the first embodiment depending on the situation in which the operating lever 11 is held.

Specifically, the keeping state map 94 is set so that the absolute value of a keeping state tilt angle θlh that is a lever tilt angle θl when determination is made that the keeping condition is satisfied is at a point corresponding to the origin of the normal state map 93. That is, the absolute value of the angle axial force Fa in the keeping state map 94 is set to a value that is shifted to a positive value side that is the right side in the figure by an amount corresponding to the absolute value of the keeping state tilt angle θlh while keeping the tendency set in the normal state map 93. In this case, the range from zero to the keeping state tilt angle θlh in the keeping state map 94 corresponds to the dead band in which the absolute value of the angle axial force Fa is kept at zero with respect to a change in the lever tilt angle θl. That is, in the configuration of the present embodiment, the angle axial force Fa is not reflected in the reaction torque command value T* when determination is made that the keeping condition is satisfied. In the configuration of the present embodiment, the range of the dead band for the angle axial force Fa changes depending on the magnitude of the keeping state tilt angle θlh.

In step 105 shown in FIG. 5, the angle axial force calculation unit 81 calculates, as the keeping state tilt angle θlh, a lever tilt angle θl when the determination in step 103 is YES. The angle axial force calculation unit 81 calculates the angle axial force Fa using the keeping state map 94 set so that the absolute value of the keeping state tilt angle θlh is at the point corresponding to the origin of the normal state map 93. According to the present embodiment, the same functions and effects as those of the first embodiment are achieved.

Other Embodiments

Each of the above embodiments can be modified as follows. The above embodiments and the following modifications can be combined as long as no technical contradiction arises.

In the first embodiment, the normal state map 91 may have a dead band for the angle axial force Fa with respect to a change in the lever tilt angle θl. The same applies to the normal state map 93 of the second embodiment.

In the first embodiment, the keeping state map 92 may have a tendency different from the tendency set in the normal state map 91. In this case, it is only necessary that the absolute value of the angle axial force Fa in the keeping state map 92 be smaller than the absolute value of the angle axial force Fa in the normal state map 91 at any lever tilt angle θl and at any vehicle speed V. The same applies to the keeping state map 94 of the second embodiment.

In the second embodiment, the keeping state map 94 may be set so that the point corresponding to the origin of the normal state map 93 approaches the absolute value of the keeping state tilt angle θlh that is the lever tilt angle θl when determination is made that the keeping condition is satisfied. Further, the keeping state map 94 may be set so that the point corresponding to the origin of the normal state map 93 exceeds the absolute value of the keeping state tilt angle θlh that is the lever tilt angle θl when determination is made that the keeping condition is satisfied.

In the above embodiments, the configuration for calculating the current axial force Fb may be omitted from the reaction torque command value calculation unit 61. In this case, the angle axial force Fa is calculated as the reaction torque command value T*.

In the above embodiments, in the keeping state calculation mode, the reaction torque command value calculation unit 61 may execute calculation so that the absolute values of both the angle axial force Fa and the current axial force Fb are smaller than those in the normal state calculation mode. In the keeping state calculation mode, the reaction torque command value calculation unit 61 may execute calculation so that the absolute value of the current axial force Fb is smaller than that in the normal state calculation mode. In this case, the configuration for calculating the angle axial force Fa may be omitted from the reaction torque command value calculation unit 61.

In the above embodiments, the reaction torque command value calculation unit 61 may calculate a vehicle state quantity axial force that can be calculated based on the vehicle speed V, the lateral acceleration GY, and the yaw rate γ, instead of the current axial force Fb. The reaction torque command value calculation unit 61 may calculate a tire axial force obtained in consideration of a tire force acting on the steered wheels 3, instead of the current axial force Fb. The vehicle state quantity axial force and the tire axial force may also be used by being added to the angle axial force Fa and the current axial force Fb.

In the above embodiments, the reaction torque command value calculation unit 61 may be configured to calculate the reaction torque command value T* based on the vehicle speed V, the lever tilt angle θl, and the actual steering current value It. In this case, the map to be used to calculate the reaction torque command value T* may be any map indicating the relationship of the reaction torque command value T* with respect to the lever tilt angle θl, the vehicle speed V, and the actual steering current value It.

In the above embodiments, when calculating the difference upper limit value ΔT*lim, the guard processing unit 62 may use only the vehicle speed V, only the lateral acceleration GY, or only the yaw rate γ. In the calculation of the difference upper limit value ΔT*lim, the vehicle speed V and the lateral acceleration GY may be used, the vehicle speed V and the yaw rate γ may be used, or the lateral acceleration GY and the yaw rate γ may be used. In the calculation of the difference upper limit value ΔT*lim, other elements may be used instead of the vehicle speed V, the lateral acceleration GY, and the yaw rate γ, or other elements may be used in combination. Examples of other possible elements include the vertical acceleration GZ of the vehicle. For example, when the vertical acceleration GZ of the vehicle is used, a condition for determining whether the vehicle is traveling on a canted road may be set in addition to the condition (a1) as the condition for determining whether the keeping condition is satisfied. In this case, the reaction torque command value calculation unit 61 may determine that the keeping condition is satisfied, for example, under the condition that the vehicle speed V is equal to or greater than a speed threshold and the vertical acceleration GZ is equal to or smaller than a tilt determination threshold. The tilt determination threshold is a value within a range in which determination can be made that the vehicle is traveling on a canted road, and is preset to a negative value.

In the above embodiments, the difference upper limit value $\Delta T^*$lim may be a fixed value.

In the above embodiments, the configuration of the guard processing unit 62 may be omitted from the reaction force control unit 60.

In the above embodiments, when executing the F/B calculation, the control signal generation unit 63 of the reaction force control unit 60 may execute a guard process on a deviation between a current command value calculated based on the reaction torque command value T* and an actual current value of the reaction force motor 16. In this case, the control signal generation unit 63 only needs to have a configuration corresponding to the guard processing unit 62. For example, the guard processing unit 62 receives the deviation between the current command value and the actual current value of the reaction force motor 16 instead of the difference $\Delta T^*$.

In the above embodiments, when calculating the angle axial force Fa, the reaction torque command value calculation unit 61 of the reaction force control unit 60 may execute a guard process on a deviation between the angle axial force Fa in the current cycle and the angle axial force Fa in the immediately preceding cycle. In this case, the reaction torque command value calculation unit 61 only needs to have a configuration corresponding to the guard processing unit 62. For example, the guard processing unit 62 receives the deviation between the angle axial force Fa in the current cycle and the angle axial force Fa in the immediately preceding cycle instead of the difference $\Delta T^*$.

In the above embodiments, when calculating the keeping state threshold $\omega$ltha, the reaction torque command value calculation unit 61 may use only the vehicle speed V, only the lateral acceleration GY, or only the yaw rate $\gamma$. When calculating the keeping state threshold $\omega$ltha, the vehicle speed V and the lateral acceleration GY may be used, the vehicle speed V and the yaw rate $\gamma$ may be used, or the lateral acceleration GY and the yaw rate $\gamma$ may be used. When calculating the keeping state threshold $\omega$ltha, other elements may be used instead of the vehicle speed V, the lateral acceleration GY, and the yaw rate $\gamma$, or other elements may be used in combination. Examples of other possible elements include the vertical acceleration GZ of the vehicle.

In the above embodiments, the steering corresponding angle calculation unit 71 may be omitted from the steering control unit 70. In this case, for example, the steering corresponding angle $\theta p$ that is the rotation angle of the pinion shaft 21 may be input from a sensor that detects this rotation angle. This sensor may detect the rotation angle of the pinion shaft 21 as an absolute angle exceeding the range of 360°.

In the above embodiments, the reaction torque command value calculation unit 61 may calculate the angle axial force Fa using the normal state map 91, 93 and then correct the angle axial force Fa to calculate the angle axial force Fa in the keeping state calculation mode. In this case, the configuration of the keeping state map 92, 94 can be omitted. As a correction method, for example, the reaction torque command value T* calculated using the normal state map 91, 93 may be offset.

In the above embodiments, the reaction torque command value calculation unit 61 may include two or more normal state maps. For example, in the case where a first normal state map and a second normal state map are provided, the first normal state map and the second normal state map may be switched by the driver's operation on the vehicle. In this case, the reaction torque command value calculation unit 61 only needs to include a first keeping state map and a second keeping state map corresponding to the first normal state map and the second normal state map.

In the above embodiments, the normal state calculation information and the keeping state calculation information may be, for example, functions instead of the normal state map 91, 93 and the keeping state map 92, 94.

In the above embodiments, when determining whether the keeping condition is satisfied, the reaction torque command value calculation unit 61 may use other elements instead of the operating speed $\omega$l, or may use other elements in combination. Examples of other possible elements include an operation acceleration that is the amount of change in the operating speed $\omega$l, the steering corresponding angle $\theta p$, and a steering speed that is the amount of change in the steering corresponding angle $\theta p$.

In the above embodiments, the operating lever 11 may be provided with a torque sensor that detects the operating force applied to the operating lever 11 by the driver. In this case, the detection result of the torque sensor can be used when determining whether the keeping condition is satisfied or when calculating the reaction torque command value T*.

In the above embodiments, the keeping state threshold $\omega$ltha and the termination state threshold $\omega$lthb may be set to the same value. That is, the condition (b1) can be that the operating speed $\omega$l of the operating lever 11 is equal to or greater than the keeping state threshold $\omega$ltha. As a result, the process shown in FIG. 5 can be configured such that the processes of steps 104, 106, 107, 108 are omitted and the process of step 109 is executed when step 103 is NO. In this case, the process shown in FIG. 5 can be configured such that the process of step 109 is executed after the process of step 101 and the process of step 103 is executed after the process of step 109. After the process of step 103 is YES, the process of step 105 can be executed.

In the above embodiments, the processing procedure executed by the guard processing unit 62 is not limited to the procedure shown in FIG. 6, and may be changed as appropriate. For example, the process of step 201 may be executed after the process of step 204 is NO.

In the above embodiments, the lever tilt angle $\theta l$ may be detected based on the rotation angle of the reaction force motor 16.

In the above embodiments, the convertible value that can be converted into the steered angle $\theta i$ of the steered wheels 3 is the rotation angle of the pinion shaft 21. However, the convertible value is not limited to this, and may be, for example, the stroke amount of the rack shaft 22, or the steered angle θi itself.

In the above embodiments, the operating lever 11 is tiltably supported by the base 12. However, the operating lever 11 is not limited to this, and may be, for example, supported so as to be slidable relative to the base 12. In this case, the amount of operation by the driver is represented by the amount of sliding of the operating lever 11. The operating lever 11 may be used to control driving/braking of the vehicle, in addition to controlling the steered angle θi of the steered wheels 3.

In the above embodiments, the operation unit 4 may include, in addition to the operating lever 11, a steering wheel that is operated by the driver. The steering system 2 has a linkless structure in which power transmission between the operation unit 4 and the steering unit 5 is separated. However, the steering system 2 is not limited to this. When the steering wheel is provided, the steering system 2 may have a structure in which power transmission between the operation unit 4 and the steering unit 5 can be separated by a clutch.

In the above embodiments, the reaction force control unit 60 and the steering control unit 70 may be individual processing circuits. In this case, the reaction force actuator 15 of the operation unit 4 may be provided with a processing circuit for the reaction force control unit 60. The steering actuator 31 of the steering unit 5 may be provided with a processing circuit for the steering control unit 70.

In the above embodiments, the steering actuator 31 transmits rotation of the steering motor 32 to the ball screw mechanism 35 via the belt mechanism 34. However, the steering actuator 31 is not limited to this. For example, the steering actuator 31 may be configured to transmit rotation of the steering motor 32 to the ball screw mechanism 35 via a gear mechanism. Alternatively, the steering actuator 31 may be configured such that the steering motor 32 directly rotates the ball screw mechanism 35. Alternatively, the steering unit 5 may include a second rack and pinion mechanism, and the steering actuator 31 may be configured to apply a steering force to the steering unit 5 by converting rotation of the steering motor 32 into a reciprocating motion of the rack shaft 22 by the second rack and pinion mechanism.

Other Technical Ideas

Next, technical ideas that can be comprehended from the above embodiments and modifications will additionally be described below.

(i) The reaction force command value calculation unit may be configured to, after the keeping condition is satisfied, execute the termination condition determination process for determining whether the termination condition for terminating the keeping state calculation mode is satisfied. The calculation mode switching process may include a process of, when the termination condition is satisfied, terminating the keeping state calculation mode and switching the keeping state calculation mode to the normal state calculation mode.

The invention claimed is:

1. A steering control device that controls a steering system of a vehicle, the steering system having a structure in which a power transmission path between an operation unit including an operating lever and configured to apply an operation reaction force to the operating lever according to an operation amount of the operating lever and a steering unit configured to steer a steered wheel is separated, the steering control device comprising:
    a reaction force command value calculation unit configured to calculate a reaction force command value that is a command value of the operation reaction force to reflect a reaction force component calculated based on a state variable obtained from the vehicle; and
    a control signal generation unit configured to generate a control signal for operating the operation unit based on the reaction force command value, wherein
    the reaction force command value calculation unit includes a keeping state calculation mode and a normal state calculation mode as calculation modes of the reaction force command value,
    the normal state calculation mode is a mode in which the reaction force command value is calculated in a non-keeping state in which the operation amount is not kept constant,
    the keeping state calculation mode is a mode in which the reaction force command value is calculated in a keeping state in which the operation amount is kept constant, and is a mode in which the reaction force command value having an absolute value smaller than an absolute value of the reaction force command value calculated in the normal state calculation mode is calculated,
    the reaction force command value calculation unit is configured to execute:
        a keeping state determination process for determining whether a keeping condition for detecting the keeping state is satisfied; and
        a calculation mode switching process for switching the calculation mode of the reaction force command value to the keeping state calculation mode when the keeping condition is satisfied, and
    the keeping state calculation mode is configured such that a dead band that is a range in which the reaction force component does not change with respect to the operation amount is larger than a dead band in the normal state calculation mode.

2. The steering control device according to claim 1, wherein
    the reaction force command value calculation unit includes a memory,
    the memory stores calculation information indicating a relationship between the operation amount and the reaction force component and to be used when the reaction force component is calculated,
    the calculation information includes normal state calculation information to be used in the normal state calculation mode, and keeping state calculation information to be used in the keeping state calculation mode, and
    the calculation mode switching process includes a process of switching the calculation information to the keeping state calculation information when the keeping condition is satisfied.

3. The steering control device according to claim 1, wherein the keeping condition includes a condition based on a result of comparison between an operation amount parameter indicating a change state of the operation amount and a threshold.

4. The steering control device according to claim 3, wherein the threshold of the keeping condition is calculated based on a travel parameter indicating a travel condition of the vehicle.

5. The steering control device according to claim 4, wherein the travel parameter includes at least one of a vehicle speed, a lateral acceleration, and a yaw rate.

6. The steering control device according to claim 1, further comprising:
- a subtractor configured to calculate a difference between a previous value and a current value of the reaction force command value; and
- a guard processing unit configured to execute a guard process for limiting the reaction force command value based on the difference, wherein
- an execution condition as to whether to execute the guard process includes a condition based on a result of comparison between the difference and a difference upper limit value.

7. The steering control device according to claim 6, wherein the guard process includes an upper limit value calculation process for calculating the difference upper limit value based on a travel parameter indicating a travel condition of the vehicle.

8. The steering control device according to claim 1, wherein the reaction force command value calculation unit is configured to execute:
- a reaction force component calculation process for calculating a plurality of reaction force components as the reaction force component; and
- a reaction force command value calculation process for calculating the reaction force command value to reflect at least one of the plurality of reaction force components, wherein
- the keeping state calculation mode is a mode in which, in the reaction force component calculation process, calculation is executed so that an absolute value of the at least one of the reaction force components is smaller than an absolute value in the normal state calculation mode.

9. A steering control device that controls a steering system of a vehicle, the steering system having a structure in which a power transmission path between an operation unit including an operating lever and configured to apply an operation reaction force to the operating lever according to an operation amount of the operating lever and a steering unit configured to steer a steered wheel is separated, the steering control device comprising:
- a reaction force command value calculation unit configured to calculate a reaction force command value that is a command value of the operation reaction force to reflect a reaction force component calculated based on a state variable obtained from the vehicle; and
- a control signal generation unit configured to generate a control signal for operating the operation unit based on the reaction force command value, wherein
- the reaction force command value calculation unit includes a keeping state calculation mode and a normal state calculation mode as calculation modes of the reaction force command value,
- the normal state calculation mode is a mode in which the reaction force command value is calculated in a non-keeping state in which the operation amount is not kept constant,
- the keeping state calculation mode is a mode in which the reaction force command value is calculated in a keeping state in which the operation amount is kept constant, and is a mode in which the reaction force command value having an absolute value smaller than an absolute value of the reaction force command value calculated in the normal state calculation mode is calculated,
- the reaction force command value calculation unit is configured to execute:
  - a keeping state determination process for determining whether a keeping condition for detecting the keeping state is satisfied; and
  - a calculation mode switching process for switching the calculation mode of the reaction force command value to the keeping state calculation mode when the keeping condition is satisfied,
- each of the normal state calculation mode and the keeping state calculation mode has a relationship of the reaction force component with respect to the operation amount, and
- an origin of the relationship in the keeping state calculation mode is shifted to a side of the operation amount at a time when determination is made that the keeping condition is satisfied compared to an origin of the relationship in the normal state calculation mode.

10. The steering control device according to claim 9, wherein
- the reaction force command value calculation unit includes a memory,
- the memory stores calculation information indicating a relationship between the operation amount and the reaction force component and to be used when the reaction force component is calculated,
- the calculation information includes normal state calculation information to be used in the normal state calculation mode, and keeping state calculation information to be used in the keeping state calculation mode, and
- the calculation mode switching process includes a process of switching the calculation information to the keeping state calculation information when the keeping condition is satisfied.

11. The steering control device according to claim 9, wherein the keeping condition includes a condition based on a result of comparison between an operation amount parameter indicating a change state of the operation amount and a threshold.

12. The steering control device according to claim 11, wherein the threshold of the keeping condition is calculated based on a travel parameter indicating a travel condition of the vehicle.

13. The steering control device according to claim 12, wherein the travel parameter includes at least one of a vehicle speed, a lateral acceleration, and a yaw rate.

14. The steering control device according to claim 9, further comprising:
- a subtractor configured to calculate a difference between a previous value and a current value of the reaction force command value; and
- a guard processing unit configured to execute a guard process for limiting the reaction force command value based on the difference, wherein
- an execution condition as to whether to execute the guard process includes a condition based on a result of comparison between the difference and a difference upper limit value.

15. The steering control device according to claim 14, wherein the guard process includes an upper limit value calculation process for calculating the difference upper limit value based on a travel parameter indicating a travel condition of the vehicle.

16. The steering control device according to claim 9, wherein the reaction force command value calculation unit is configured to execute:
- a reaction force component calculation process for calculating a plurality of reaction force components as the reaction force component; and
- a reaction force command value calculation process for calculating the reaction force command value to reflect at least one of the plurality of reaction force components, wherein the keeping state calculation mode is a mode in which, in the reaction force component calculation process, calculation is executed so that an absolute value of the at least one of the reaction force components is smaller than an absolute value in the normal state calculation mode.

17. A steering control method for controlling a steering system of a vehicle, the steering system having a structure in which a power transmission path between an operation unit including an operating lever and configured to apply an operation reaction force to the operating lever according to an operation amount of the operating lever and a steering unit configured to steer a steered wheel is separated, the steering control method comprising:
- calculating a reaction force command value that is a command value of the operation reaction force to reflect a reaction force component calculated based on a state variable obtained from the vehicle; and
- generating a control signal for operating the operation unit based on the reaction force command value, wherein the calculating the reaction force command value includes a keeping state calculation mode and a normal state calculation mode as calculation modes of the reaction force command value, the normal state calculation mode is a mode in which the reaction force command value is calculated in a non-keeping state in which the operation amount is not kept constant, the keeping state calculation mode is a mode in which the reaction force command value is calculated in a keeping state in which the operation amount is kept constant, and is a mode in which the reaction force command value having an absolute value smaller than an absolute value of the reaction force command value calculated in the normal state calculation mode is calculated, the calculating the reaction force command value includes executing:
- a keeping state determination process for determining whether a keeping condition for detecting the keeping state is satisfied; and
- a calculation mode switching process for switching the calculation mode of the reaction force command value to the keeping state calculation mode when the keeping condition is satisfied, and the keeping state calculation mode is configured such that a dead band that is a range in which the reaction force component does not change with respect to the operation amount is larger than a dead band in the normal state calculation mode.

* * * * *